(12) United States Patent
Michaud-Lariviere (10) Patent No.: US 12,305,616 B1
(45) Date of Patent: May 20, 2025

(54) AEROGENERATOR SYSTEM, HYBRID ENERGY GENERATING SYSTEM AND SYSTEM

(71) Applicant: Wattmakers LLC, Oakland, CA (US)

(72) Inventor: Jérôme François Marie Michaud-Lariviere, Paris (FR)

(73) Assignee: Wattmakers LLC, Oakland, CA (US)

( * ) Notice: Subject to any disclaimer, the term of this patent is extended or adjusted under 35 U.S.C. 154(b) by 0 days.

(21) Appl. No.: 18/585,796

(22) Filed: Feb. 23, 2024

(51) Int. Cl.
| | |
|---|---|
| *F03D 3/02* | (2006.01) |
| *F03D 3/00* | (2006.01) |
| *F03D 9/00* | (2016.01) |
| *H02K 7/18* | (2006.01) |
| *H02S 10/12* | (2014.01) |

(52) U.S. Cl.
CPC .............. *F03D 3/02* (2013.01); *F03D 3/005* (2013.01); *F03D 9/007* (2013.01); *H02K 7/183* (2013.01); *H02S 10/12* (2014.12); *F05B 2220/708* (2013.01); *F05B 2240/211* (2013.01); *F05B 2240/37* (2020.08); *F05B 2240/9112* (2013.01)

(58) Field of Classification Search
CPC . F03D 3/02; F03D 3/005; F03D 9/007; F05B 2240/211; F05B 2240/37; F05B 2240/9112; H02K 7/183; H02S 10/12
See application file for complete search history.

(56) References Cited

U.S. PATENT DOCUMENTS

| | | | | | |
|---|---|---|---|---|---|
| 1,976,706 | A | * | 10/1934 | Werner | B64F 1/20 362/276 |
| 2,431,111 | A | * | 11/1947 | Du Brie | F03D 3/02 290/55 |
| 4,023,368 | A | * | 5/1977 | Kelly | F24S 50/20 136/246 |
| 4,079,264 | A | * | 3/1978 | Cohen | F03D 1/04 415/4.4 |
| 4,200,904 | A | * | 4/1980 | Doan | F21S 9/035 362/183 |
| 4,236,866 | A | * | 12/1980 | Zapata Martinez | F03D 9/00 416/126 |
| 4,245,958 | A | * | 1/1981 | Ewers | F03D 13/20 416/197 A |
| 4,365,929 | A | * | 12/1982 | Retz | F03D 13/20 416/197 A |
| 4,486,143 | A | * | 12/1984 | McVey | F03D 3/0427 415/53.3 |
| 5,254,876 | A | * | 10/1993 | Hickey | F03D 9/25 290/55 |
| 6,036,443 | A | * | 3/2000 | Gorlov | F03D 3/062 415/75 |
| 7,875,990 | B2 | * | 1/2011 | Wang | F03D 9/008 290/43 |
| 8,128,364 | B2 | * | 3/2012 | Pesetsky | F03D 1/0675 415/4.3 |

(Continued)

FOREIGN PATENT DOCUMENTS

FR 3058285 A1 5/2018
WO 2016042265 A1 3/2016

*Primary Examiner* — Pedro J Cuevas
(74) *Attorney, Agent, or Firm* — Weitzman Law Offices, LLC (57) ABSTRACT

The wind turbine comprises a rotor which rotates with respect to a stator about a rotation axis. The rotor comprises at least one blade with a cavity, and a particulate filter fixed into the cavity.

19 Claims, 6 Drawing Sheets

(56) References Cited

U.S. PATENT DOCUMENTS

| | | | |
|---|---|---|---|
| 8,134,252 B2* | 3/2012 | Pagliasotti | F03D 3/04 290/55 |
| 8,282,236 B2* | 10/2012 | Pelken | H02S 10/12 362/183 |
| 8,552,580 B2* | 10/2013 | Tackett | F03D 7/02 60/641.11 |
| 9,416,774 B2* | 8/2016 | Jordan, Sr. | H02S 10/12 |
| 9,689,372 B2* | 6/2017 | Gonzalez | F03D 9/25 |
| 9,835,133 B2* | 12/2017 | Al-Garni | F03D 3/005 |
| 9,874,197 B2* | 1/2018 | Christopher | F03B 13/264 |
| 10,094,361 B2* | 10/2018 | Bardia | H02K 7/183 |
| 10,148,090 B2* | 12/2018 | Gillett | H02J 3/30 |
| 10,158,238 B2* | 12/2018 | Gochev | H05B 47/105 |
| 10,167,846 B2* | 1/2019 | Azmudeh | F03D 3/0427 |
| 11,236,724 B2* | 2/2022 | Reyna | F03D 15/00 |
| 11,313,347 B2* | 4/2022 | Rakoczi | F03D 3/02 |
| 11,821,406 B1* | 11/2023 | Toor | F03D 3/062 |
| 11,835,031 B2* | 12/2023 | Hench | F03D 9/25 |
| 2003/0209911 A1* | 11/2003 | Pechler | F03D 3/02 290/55 |
| 2008/0037243 A1* | 2/2008 | Discoe | F21S 9/026 362/183 |
| 2008/0042446 A1* | 2/2008 | Kurtz | H02S 10/12 290/55 |
| 2008/0047270 A1* | 2/2008 | Gilbert | F03D 9/11 60/641.12 |
| 2008/0145224 A1* | 6/2008 | Mitchell | F03D 7/06 416/240 |
| 2008/0209940 A1* | 9/2008 | Whisson | E03B 3/28 62/467 |
| 2009/0015015 A1* | 1/2009 | Joutsiniemi | F03D 3/02 290/52 |
| 2009/0160196 A1* | 6/2009 | Metzloff | F03D 3/0463 290/55 |
| 2009/0244890 A1* | 10/2009 | Pelken | F21S 8/088 290/55 |
| 2009/0261595 A1* | 10/2009 | Poo | F03D 3/02 290/55 |
| 2010/0109337 A1* | 5/2010 | Wang | F03D 3/067 290/55 |
| 2010/0143151 A1* | 6/2010 | Kinzie | F03D 1/0675 416/248 |
| 2010/0181779 A1* | 7/2010 | Elliott | F03D 9/25 290/55 |
| 2010/0219643 A1* | 9/2010 | Biucchi | F03D 9/007 290/55 |
| 2010/0220466 A1* | 9/2010 | Pelken | H02S 10/12 362/183 |
| 2011/0103942 A1* | 5/2011 | Green | F03D 13/20 415/211.1 |
| 2011/0140450 A1* | 6/2011 | Kawas | F03D 9/25 290/55 |
| 2011/0142629 A1* | 6/2011 | Pesetsky | F03D 1/0675 416/23 |
| 2011/0176256 A1* | 7/2011 | Van Straten | F03D 13/20 290/55 |
| 2011/0215583 A1* | 9/2011 | Lee | F03D 15/10 290/55 |
| 2011/0221196 A1* | 9/2011 | Kawas | H02S 10/12 290/55 |
| 2012/0020788 A1* | 1/2012 | Lucy | F03D 3/0409 416/204 R |
| 2012/0074706 A1* | 3/2012 | Lynn | F03D 9/25 290/55 |
| 2012/0119504 A1* | 5/2012 | Vigaev | F03D 3/0418 415/45 |
| 2012/0134823 A1* | 5/2012 | Tully | F03D 1/0633 416/131 |
| 2012/0302228 A1* | 11/2012 | Gray | H02J 3/381 307/69 |
| 2014/0010654 A1* | 1/2014 | Fajardo | F03D 3/061 416/147 |
| 2014/0105738 A1* | 4/2014 | Bassett | F03D 9/25 239/589 |
| 2014/0105743 A1* | 4/2014 | Bassett | F03D 3/061 416/126 |
| 2014/0305497 A1* | 10/2014 | Petrosillo | F03D 9/11 415/4.2 |
| 2015/0098795 A1* | 4/2015 | Gonzalez | H02S 10/12 415/4.2 |
| 2015/0108762 A1 | 4/2015 | Michaud-Lariviere | |
| 2015/0167636 A1* | 6/2015 | Al-Garni | H02S 10/12 290/55 |
| 2015/0345473 A1* | 12/2015 | Bardia | F03D 80/70 290/55 |
| 2016/0377053 A1* | 12/2016 | Reyna | F03D 3/005 415/210.1 |
| 2017/0051720 A1* | 2/2017 | Grigg | F03D 3/005 |
| 2018/0100483 A1* | 4/2018 | Tutunaru | F15D 1/0005 |
| 2018/0135599 A1* | 5/2018 | Baxter, Jr. | F03D 3/0418 |
| 2018/0156193 A1* | 6/2018 | Hench | F03D 3/005 |
| 2020/0300217 A1* | 9/2020 | Reyna | F03D 15/00 |
| 2022/0228555 A1* | 7/2022 | Reyna | F03D 3/005 |
| 2022/0290649 A1* | 9/2022 | Hench | F03D 3/064 |
| 2023/0392578 A1* | 12/2023 | Toor | F03D 3/005 |
| 2024/0060467 A1* | 2/2024 | Hench | F03D 9/11 |

* cited by examiner

AEROGENERATOR SYSTEM, HYBRID ENERGY GENERATING SYSTEM AND SYSTEM

FIELD OF INVENTION

The present invention relates to the field of wind turbines.

BACKGROUND OF THE INVENTION

Wind turbines typically comprise an electrical generator which comprises a generator rotor rotating with respect to a generator stator about a rotation axis, this movement generating electricity. The rotor typically has one or more blades which are designed to catch the wind, so that the wind imparts the rotary motion to the rotor. In the field of wind turbines, one approach is to generate more and more power by ever-larger wind turbines. One issue however is that these very large wind turbines trouble human life and, therefore, they are to be placed far away from humans and human activities. This technology therefore relies on electrical cables to bring the generated electricity from where it is produced to where it is needed, but much energy is lost during transportation.

Recently, it was proposed in US 2015/108762 to use smaller such wind turbines, which can therefore be integrated where energy is needed. In order to make such wind turbines acceptable, a biomorphic approach was used, and many small wind turbines are provided on a tree-like structure.

The challenges associated with this technology are to generate enough power while not degrading the biomorphism, in order to ensure the acceptability.

SUMMARY OF THE INVENTION

According to the invention, it is provided an aerogenerator system, wherein the aerogenerator system comprises:
- at least two vertical axis wind turbines, wherein the wind turbines are spaced from one another along a longitudinal direction, wherein each wind turbine comprises a bottom foot and a rotor extending upward from the bottom foot, wherein the rotor is designed to rotate with respect to the bottom foot about a respective vertical rotation axis,
- a tapering structure, located above the wind turbines, and tapering along a flow direction normal to the longitudinal direction.

Thanks to these features, the air flow at the level of the wind turbines is strengthened, hence the quantity of produced electricity is increased.

According to a specific embodiment, the aerogenerator system comprises at least three wind turbines spaced from one another along the longitudinal direction.

According to a specific embodiment, at least one wind turbine is offset with respect to the longitudinal direction.

According to a specific embodiment, the tapering structure is wave-shaped.

According to a specific embodiment, the aerogenerator system further comprises a common support for the at least two vertical axis wind turbines.

According to a specific embodiment, the rotor comprises at least one blade with a cavity, and a particulate filter fixed into the cavity.

According to a specific embodiment, the particulate filter is an activated carbon filter.

According to a specific embodiment, the particulate filter is adapted to catch particles of more than 0.1 micrometers ($\mu m$), preferably more than 0.2 $\mu m$, notably more than 0.3 $\mu m$.

According to a specific embodiment, the particulate filter is adapted to catch particles of less than 0.5 micrometers ($\mu m$), preferably less than 0.4 $\mu m$, notably less than 0.3 $\mu m$.

According to a specific embodiment, the particulate filter has a thickness between 1 and 10 millimeters (mm), notably between 1.5 and 8 mm, more preferably before 2 and 6 mm.

According to a specific embodiment, the particulate filter is removably fixed into the cavity.

According to a specific embodiment, the rotor of at least one wind turbine comprises at least one narrow blade with a blade edge, the at least one narrow blade has a first maximal lateral extension measured from the rotation axis to the blade edge of said narrow blade, and said rotor comprises at least one wide blade with a blade edge, the at least one wide blade
- has a second maximal lateral extension measured from the rotation axis to the blade edge of said wide blade,
- said blades are fixed with respect to one another,
- the second maximal lateral extension is at least 1.5 times the first maximal lateral extension, and said particulate filter is fixed to either said narrow blade or said wide blade.
- the narrow blade has a first maximal height along the rotation axis, and the wide blade has a second maximal height along the rotation axis, and the first maximal height is greater than the second maximal height.

According to a specific embodiment, at least one wind turbine comprises a narrow blade portion and a wide blade portion which are separated from one another along the rotation axis, and all narrow blades of said at least one wind turbine are provided in the narrow blade portion and all wide blades of said at least one wind turbine are provided in the wide blade portion.

According to a specific embodiment, the narrow blade portion is a single piece. This enables to limit or reduce the number of mechanical fastenings used in the narrow blade portion, which in turn is benefic to withstand dynamic stresses and fatigue which typically occur at fastenings in mechanical devices. Since less energy is dissipated at fastenings, more of the imparted energy may contribute to the production of electricity.

According to a specific embodiment, the narrow blade portion is made of an additive manufacturing material.

According to a specific embodiment, the at least one narrow blade has a thickness which continuously increases from the blade edge.

According to a specific embodiment, the wide blade portion is mechanically assembled to the narrow blade portion.

According to a specific embodiment, the wide blade portion comprises a plurality of blade components which are assembled to one another.

According to a specific embodiment, the blade components are identical to one another. This enables to reduce the tooling necessary for production, which has a positive energetic impact.

According to a specific embodiment, each wind turbine further comprises an electrical generator comprising a generator rotor and a generator stator, wherein the generator rotor is designed to rotate with respect to the generator stator about said rotation axis, wherein the generator rotor is assembled to the rotor of a respective wind turbine, wherein the electrical generator is housed within the wide blade portion of the respective wind turbine.

According to a specific embodiment, the wide blade comprises a plurality of lobes separated from one another by a recess.

According to a specific embodiment, at least one wind turbine comprises a first number of at least two narrow blades, wherein the narrow blades are equally spaced from one another about the rotation axis, wherein said wind turbine comprises a second number of at least two wide blades, wherein the wide blades are equally spaced from one another about the rotation axis.

According to a specific embodiment, the first number is strictly greater than the second number.

According to a specific embodiment, electrical current generated by the aerogenerator system is a sum of electrical currents generated by said wind turbines.

According to another aspect, the invention relates to a hybrid energy generating system comprising such an aerogenerator system and a solar generating system comprising at least one solar panel provided on the tapering structure.

According to another aspect, the invention relates to a system comprising a building having a front face, a rooftop, and a longitudinal edge between the front face and the rooftop, the system further comprising such an aerogenerator system, wherein the longitudinal direction is parallel to the longitudinal edge, wherein the horizontal distance between the bottom foot and the longitudinal edge is less than one meter.

According to another aspect, the invention relates to a system comprising a building having a front face, a rooftop, and a longitudinal edge between the front face and the rooftop, the system further comprising such a hybrid energy generating system, wherein the longitudinal direction is parallel to the longitudinal edge, wherein the horizontal distance between the bottom foot and the longitudinal edge is less than one meter.

DETAILED DESCRIPTION OF THE INVENTION

In the present invention where gravity plays a role, "vertical" is used to designate the direction passing through the center of the Earth. "Horizontal" is used to designate the plane normal to the "vertical" direction. Words like "up", "down", "high", "low", "above", "below", etc. are used with respect to the vertical direction.

The present description is provided assuming the ground is horizontal. The invention would however be applicable everywhere, even if the ground is not strictly speaking horizontal. Wind is a flow of air which is typically parallel to the horizontal. The invention remains applicable when wind flows not strictly speaking horizontally, for example due to the shape of the ground, due to obstacles to flow such as trees, buildings or else, or for other reasons.

Figure 1:
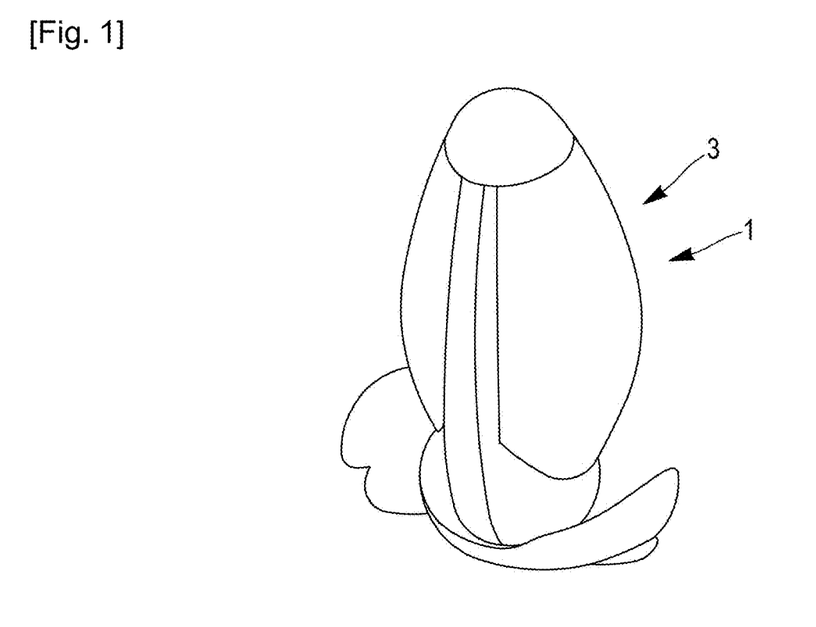
FIG. 1 is a three-dimensional top perspective view of a wind turbine according to one embodiment.
Figure 2:
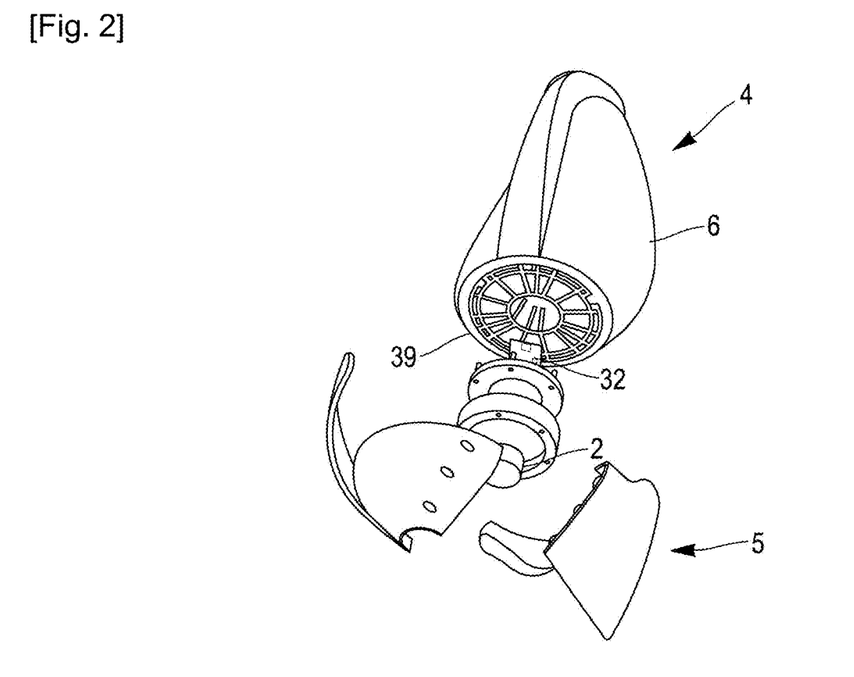
FIG. 2 is an exploded bottom perspective view of the wind turbine of FIG. 1.

FIG. 1 schematically represents an embodiment of a wind turbine 1 according to one embodiment of the invention. A wind turbine 1 comprises a stator 2 and a rotor 3. The rotor 3 is mounted to rotate with respect to the stator 2 about a fixed rotation axis (Zr). The present invention is applicable to so-called "vertical axis" wind turbines. A "vertical axis" wind turbine is a wind turbine designed to be used with its rotation axis Z, extending along the vertical direction. In the following description, it will be assumed that the wind turbine 1 is placed so that its rotation axis Zr extends vertically. Of course, the same turbine may be oriented differently.

The rotation axis is central for the rotor 3.

As can be seen on FIG. 1, according to one embodiment, the rotor 3 comprises a narrow blade portion 4 and a wide blade portion 5. The narrow blade portion 4 and the wide blade portion 5 are spaced from one another along the vertical axis. In the presented embodiment, the narrow blade portion 4 is located above the wide blade portion 5.

The narrow blade portion 4 is narrower than the wide blade portion 5. The breadth of the blade portions is measured as the maximal horizontal distance between the rotation axis and any point of the respective blade portion.

As can also be seen on FIG. 1, the narrow blade portion 4 is higher than the wide blade portion 5. The height of the blade portions is measured as the maximal vertical distance between any two points of the respective blade portion.

The narrow blade portion has a plurality of blades 6. The blades of the narrow blade portion are called "narrow blades" 6. These narrow blades 6 are equally distributed about the rotation axis. Further, the narrow blades 6 are identical to one another. This ensures a homogeneous transformation of wind energy to electrical energy. In the present example, there are three identical narrow blades 6 which form angles of 120° two by two about the rotation axis. Therefore, below, the description of a single narrow blade 6 will be provided, and this description will be applicable to the other narrow blades.

Below, we will describe one horizontal section of a narrow blade 6, with reference to FIG. 3. The rotor is designed to rotate in the clockwise direction on FIG. 3. The section comprises a proximal portion 7 and a distal portion 8. The words "proximal" and "distal" are used by reference to the central rotation axis.

The narrow blade 6 is a thin shell shaped to receive incoming wind. The shape comprises a curvature in the horizontal plane, as can be seen in FIG. 3. As can be seen on the other figures, the shape may also comprise a curvature in a vertically secant plane. The narrow blade 6 comprises a concave front face 9 and an opposed convex back face 10. The front and back faces 9 and 10 are sensibly parallel to one another. The thickness of the narrow blade 6 is sensibly constant, from the proximal portion 7 to the distal portion 8. This thickness, also called "main thickness" is for example comprised between 1.5 millimeters (mm) and 5 mm, preferably between 2.5 and 3.5 mm. This thickness of a suitable material allows supporting the imparting energy of wind with a minimum inertia. The distal portion 8 may have a continuously decreasing thickness from the connection to the proximal portion 7 to the edge 11. The thickness at the edge, also called "edge thickness", is for example not lower than 0.5 mm, notably not lower than 1.5 mm. This thickness allows sufficient strength of the edge. The ratio of the main thickness to the edge thickness is for example between 1.5 and 10, for example between 2.5 and 3.5. This allows manufacturability, strength, low inertia and low drag coefficient Cx of the blade.

Figure 3:
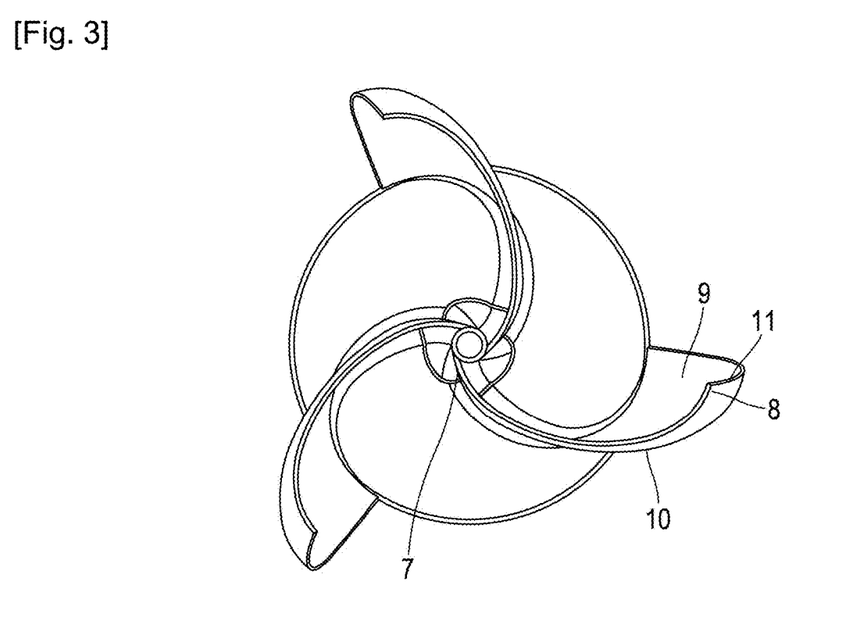
FIG. 3 is a top sectional view of the narrow blade portion of the wind turbine of FIG. 1.

As can be seen also from FIG. 3, the rotation axis Zr is disposed sensibly between the proximal portion 7 and the distal portion 8.

Figure 4:
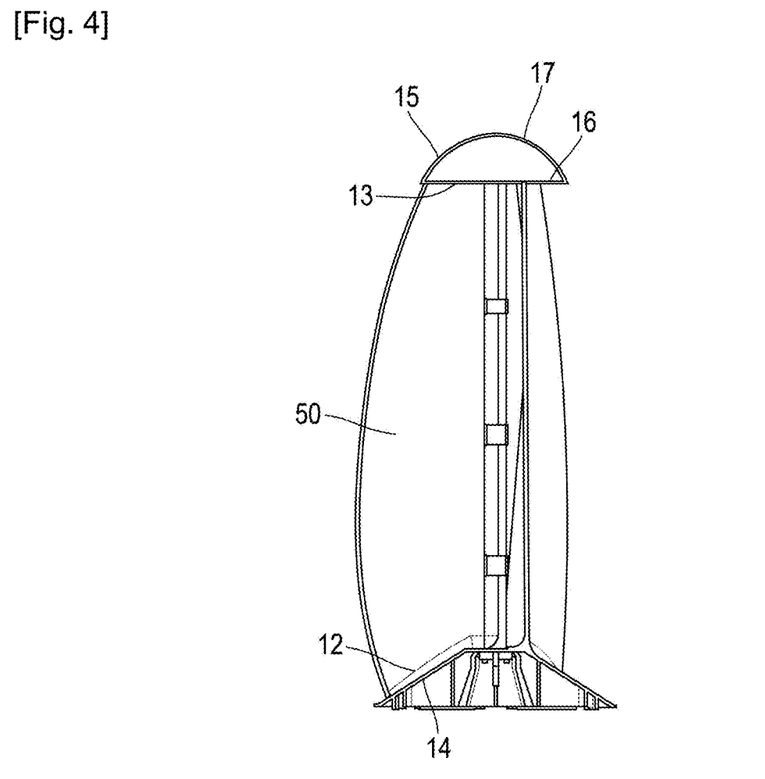
FIG. 4 is a front sectional view of the narrow blade portion of the wind turbine of FIG. 1.

Along the vertical axis, the narrow blade 6 extends from a bottom portion 12 to a top portion 13. The bottom portion 12 is connected to a base 14 along its whole width. The top portion 13 is connected to a top 15 along its whole width. These two connections ensure a firm holding of the narrow blade 9 within the rotor 3.

Along the vertical axis, the edge 11 is also continuously curved. The location with the maximal lateral extension is between the bottom portion 12 and the top portion 13. More precisely, this location is closer to the bottom portion 12 than to the top portion 13, measured along the vertical axis. This enables the narrow blade portion 4 of the rotor 3 to look like a tree leaf. For example, the distance between the bottom portion 12 and the location with the maximal lateral extension of the narrow blade 6, along the vertical axis, is between ⅕ and ⅓ of the height of the narrow blade 6, along the vertical axis. The tapering shape of the narrow blade portion 4 allows to reduce the moments of force applied to the assembly of the wind turbine to its support.

The top 15 may comprise a continuous structure 16 which is connected to the top portions 13 of all narrow blades 6, for example a flat plate. The top 15 may further comprise an outer dome 17 which is connected to the continuous structure 16 and overlies it. The dome 17 strengthens the rotor 3 and provides a rounded top shape which is harmless in case of contacts and enables the rotor to look like a tree leaf.

The base 14 may be conically shaped pointing upward, with the rotation axis Zr as cone axis. This shape enables to provide space to house other components, such as will be described below. Further, this geometry strengthens the connection of the narrow blade portion 4 with the underlying elements which will be described below.

According to one embodiment, the narrow blade portion 4 which has been described above is single-piece. This enables to get rid of mechanical connection devices which allow play between components, and are subject to vibration. For example, the narrow blade portion 4 is manufactured by additive manufacturing. This additive manufacturing technology allows to manufacture a single piece with such a complex shape as that of the narrow blade portion 4. In such case, the narrow blade portion 4 is made of a suitable additive-manufacturing material, such as polylactic acid ("PLA") or acrylonitrile butadiene styrene ("ABS") or the like. One may choose a biodegradable, non-toxic, rigid, strong and/or sustainable material. So, when, in the description above, it is mentioned that two parts, sections or portions, are "connected", it should be understood that they are formed of an integral single-piece of material under this embodiment. Additive-manufacturing enables to obtain a thin blade with good mechanical strength, which lowers weight, inertia and cost of manufacturing with respect to thicker blades.

In addition, by reducing the mechanical fastenings, less energy is dissipated as mechanical energy at such fastenings, and the risk of loosening of attachments is reduced. Loosened attachments may cause dynamic stresses and fatigue to the wind turbine. Providing the narrow blade portion 4 as a single piece thus enables to increase the life expectancy of the wind turbine 1, and to maintain a high ratio of energy conversion along time.

Figure 5:
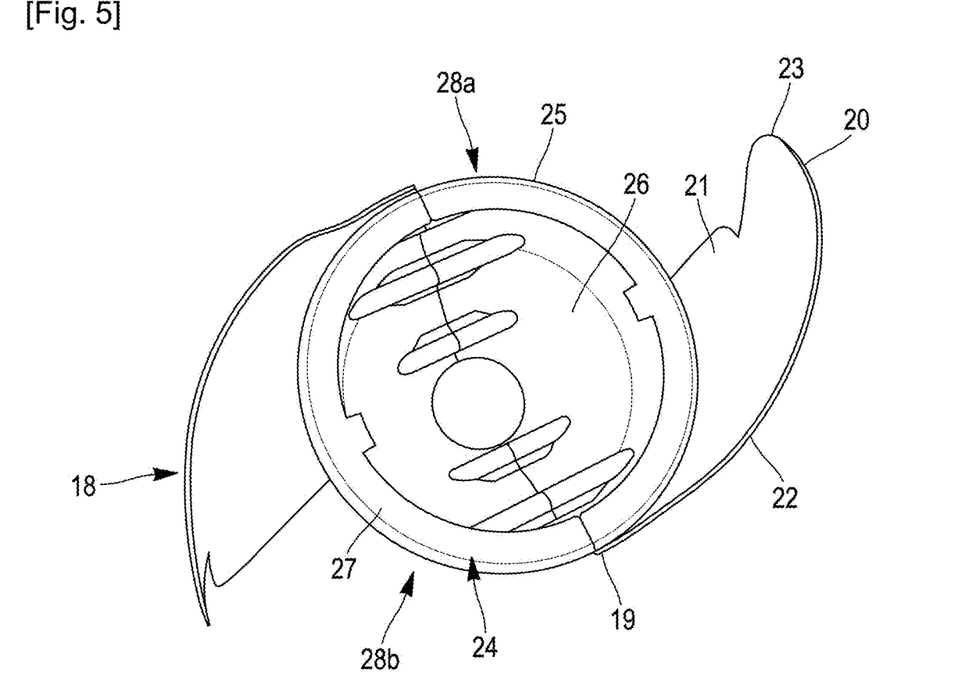
FIG. 5 is a top view of the wide blade portion of the wind turbine of FIG. 1.

As can be seen on FIG. 5, below, the rotor 3 further comprises the wide blade portion 5.

The wide blade portion 5 is wider than the narrow blade portion 4. For example, the maximal lateral extension of the wide blade portion 5 is at least 1.5 times the maximal lateral extension of the narrow blade portion 4. Notably, the ratio of the maximal lateral extension of the wide blade portion 5 to the maximal lateral extension of the narrow blade portion 4 is at least equal to 1.6, at least equal to 1.7, at least equal to 1.8, at least equal to 1.9, or at least equal to 2.

According to some embodiments, the ratio of the maximal lateral extension of the wide blade portion 5 to the maximal lateral extension of the narrow blade portion 4 is less than 2.5, notably less than 2.4, less than 2.3, less than 2.2, or even less than 2.

According to some embodiments, the diameter of the circle circumventing the wide blade portion 5, and hence the wind turbine 1, is comprised between 0.5 meters (m) and 1 m, preferably between 0.65 m and 0.7 m.

As can also be seen on FIG. 1, the wide blade portion 5 is shorter than the narrow blade portion 4, as measured along the vertical axis. For example, the maximal height of the narrow blade portion 4 is at least 1.5 times the maximal height of the wide blade portion 5. Notably, the ratio of the maximal height of the narrow blade portion 4 to the maximal height of the wide blade portion 5 is at least equal to 1.6, at least equal to 1.7, at least equal to 1.8, at least equal to 1.9, or at least equal to 2.

According to some embodiments, the ratio of the maximal height of the narrow blade portion 4 to the maximal height of the wide blade portion 5 is less than 3.5, notably less than 3 or even less than 2.5.

According to some embodiments, the height of the wind turbine 1 along the vertical axis, is comprised between 0.7 m and 1.5 m, preferably between 1.0 m and 1.2 m.

The wide blade portion 5 has a plurality of blades 18. The blades of the wide blade portion 5 are called "wide blades" 18. These wide blades 18 are equally distributed about the rotation axis. Further, the wide blades 18 are identical to one another. This ensures a homogeneous transformation of wind energy to electrical energy.

According to one embodiment, the number of wide blades 18 is identical to the number of narrow blades 6. In such an embodiment, narrow blades 6 and wide blades 18 may be aligned with one another two by two. According to a variant, the wide blades 18 are rotationally offset with respect to the narrow blades 6 about the rotation axis. The offset is for example half of the angle between two following narrow blades 6.

According to another embodiment, the number of wide blades 18 is different from the number of narrow blades 6. For example, the difference between the number of wide blades 18 and the number of narrow blades 6 is equal to 1. According to another example, it is equal to 2. For example, it is less than 6, notably less than 4.

In the present example, there are two identical wide blades 18 which form an angle of 180° with one another about the rotation axis. In addition, no wide blade 18 is aligned with a corresponding narrow blade along the vertical axis. The angle between a narrow blade 6 and a wide blade 18 is at least 30°.

Below, the description of a single wide blade 18 will be provided, and this description will be applicable to the other wide blade(s) 18.

Below, we will describe one wide blade 18, with reference to FIG. 5. The wide blade 18 comprises a proximal portion 19 and a distal portion 20. The words "proximal" and "distal" are used by reference to the central rotation axis.

The wide blade 18 is a thin shell shaped to receive incoming wind. The shape comprises a curvature in the horizontal plane, as can be seen in FIG. 5. As can be seen in the other figures, the shape may also comprise a curvature in a vertically secant plane. So, overall, the wide blade 18 defines a cavity 50. The wide blade 18 comprises a concave front face 21 and an opposed convex back face 22. With respect to the rotation axis, the concavity of the wide blade 18 is the same as that of narrow blade 6. The front and back faces 21 and 22 are sensibly parallel to one another. The thickness of the wide blade 18 is sensibly constant, from the proximal portion 19 to the distal portion 20. For example, this thickness, also called "main thickness" is the same as that of the narrow blade 6. This thickness allows supporting the imparting energy of wind with a minimum inertia. The distal portion 20 may have a continuously decreasing thickness from the connection to the proximal portion 19 to the edge 23. In other words, the thickness continuously increases, starting from the edge. The thickness at the edge, also called "edge thickness", is for example not lower than 0.5 mm. For example, it is the same as for the narrow blade 6. This thickness allows sufficient strength of the edge. The ratio of the main thickness to the edge thickness is for example between 1.5 and 10. For example, it is the same as for the narrow blade 6. This allows manufacturability, strength, low inertia and low drag coefficient Cx of the blade.

Figure 6:
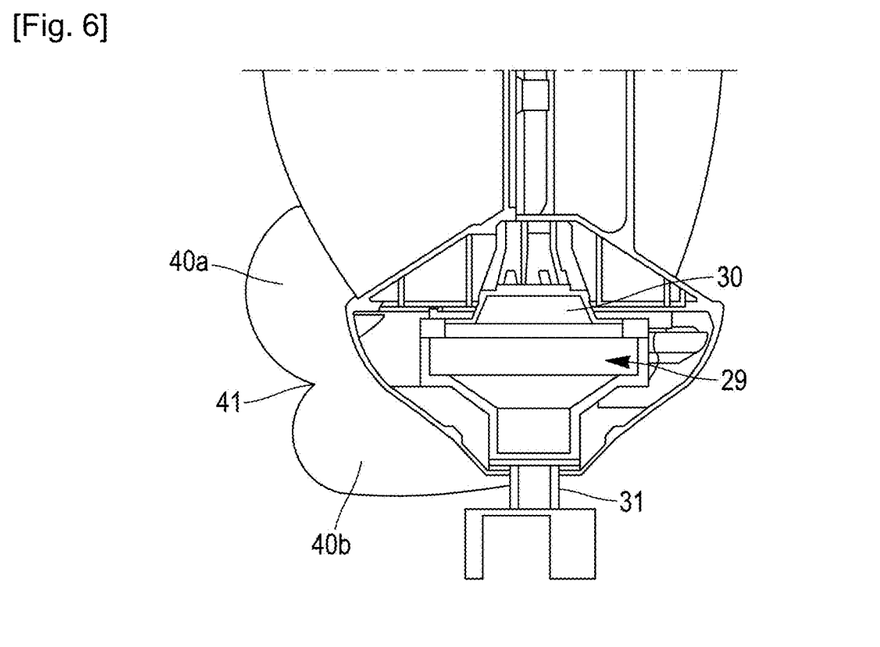
FIG. 6 is a partial front sectional view of the wind turbine of FIG. 1.

According to one embodiment, as shown in particular on FIGS. 1 and 6, the wide blade 18 comprises at least two lobes 40. The two lobes 40 are spaced from one another along the rotation axis Zr. In other words, the wide blade 18 comprises a top lobe 40a and a bottom lobe 40b. Two consecutive lobes 40a, 40b along the rotation axis are therefore separated by a recess 41. This configuration allows to reduce the drag coefficient of the wide blade 18.

According to one embodiment, the wide blade portion 5 comprises a bottom housing 24 from which the wide blades 18 extend. The bottom housing 24 is for example cup-shaped, with a narrow bottom and a large upper opening 26. The cup is for example partly spherical, or partly cylindrical of revolution. The bottom housing 24 has a shell 27 from which the wide blades 18 extend radially outward. The wide blade 18, and notably the top lobe 40a extends above the top plane of the bottom housing 24.

For example, the wide blade portion is made of a plurality of blade components which are assembled to one another by any suitable means, notably screwing, bolting, crimping or snap-fastening. According to one example, all blade components are identical, which enables to reduce the number of molds necessary for the production of the wide blade. Each blade component may comprise one single wide blade 18 and a portion of the bottom housing 24. For example, as shown on FIG. 5, the wide blade portion is made of two identical blade components 28a and 28b which are assembled to one another. Reference "28" is used to generally designate one of these blade components.

According to one embodiment, each of the blade components 28 which has been described above is single-piece. This enables to get rid of mechanical connection devices which allow play between components, and are subject to vibration. For example, the blade component 28 is manufactured by additive manufacturing. This additive manufacturing technology allows to manufacture a single piece with such a complex shape as that of the blade component 28. In such case, the blade components 28 is made of a suitable additive-manufacturing material, such as polylactic acid ("PLA") or acrylonitrile butadiene styrene ("ABS") or the like. One may choose a biodegradable, non-toxic, rigid, strong and/or sustainable material. Possibly, one will use the same material as that of the narrow blade portion 4, in order to obtain similar mechanical properties. So, when, in the description above, it is mentioned that two parts, sections or portions, are "connected", it should be understood that they are formed of an integral single-piece of material under this embodiment. According to an embodiment, the material constituting the blade component 28 is the same as that constituting the narrow blade portion 4.

The narrow blade portion 4 and the wide blade portion 5 are fixedly assembled to one another by any suitable means, such as screwing, bolting, crimping, snap-fastening, or the like. Preferably, the assembly may be undone using suitable tools, for example for maintenance.

The wind turbine 1 further comprises an electrical generator 29, such as shown on FIG. 6. The electrical generator 29 comprises a generator rotor 30 and a generator stator 31. The generator rotor 30 is designed to rotate with respect to the generator stator 31 about a rotation axis. When the electrical generator 29 is assembled within the wind turbine, this rotation axis is the rotation axis Zr. The generator rotor 30 is assembled to the rotor 3 of the wind turbine 1. In particular, as shown on FIG. 6, the electrical generator 29 is housed within the wide blade portion 5, notably in the bottom housing 24, and attached thereto and/or to the base 14 of the narrow blade portion 4 by any suitable means.

According to one embodiment, the generator rotor 30 may comprise a plurality of permanent magnets with alternated polarity, and the generator stator 31 has electrical coils intended to interact with the permanent magnets of the generator rotor 30, so that rotation of the rotor 3 generates an alternating electrical field at the generator stator 31.

The wind turbine 1 further comprises an electronical circuit 32. The electronical circuit 32 comprises a microprocessor 39 adapted to regulate the electrical current outputted from the wind turbine 1. For example, the electrical current generated by the wind turbine 1 is a 3-phase 48V alternating current.

According to some embodiments, a redresser (not shown) of the electronical circuit 32 may redress the alternating current to a DC current.

Figure 7:
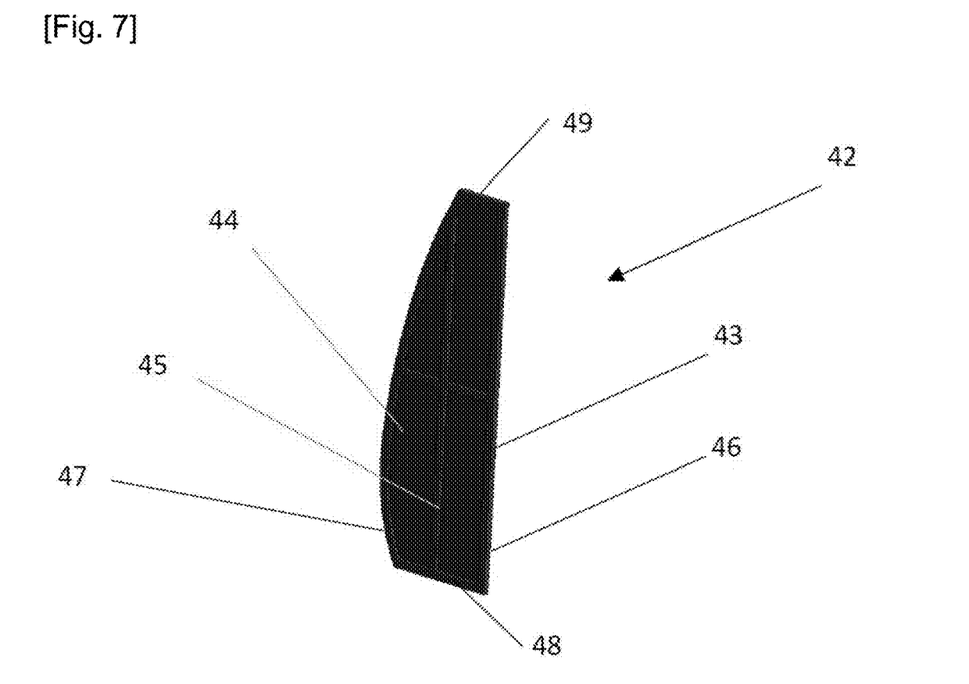
FIG. 7 is a perspective view of an embodiment of a particulate filter for the wind turbine of FIG. 1.

As can be seen on FIG. 7, the wind turbine 1 comprises a filter 42. The filter 42 is adapted to catch particles contained in the air which flows through the filter 42. The filter 42 is designed to catch specific particles. For example, the filter 42 is adapted to catch particles as a function of their size. Particulate size may be defined in any suitable way, such as average diameter of the particle or the like. For example, the particulate filter 42 is adapted to catch particles of more than 0.1 micrometers (μm), preferably more than 0.2 μm, notably more than 0.3 μm.

For example, the particulate filter 42 is adapted to catch particles of less than 0.5 micrometers (μm), preferably less than 0.4 μm, notably less than 0.3 μm.

The filter 42 is adapted to catch pollutant particles such as carbon oxides (carbon monoxide, carbon dioxide, . . . ), metals (lead, . . . ), nitrogen oxides, sulfur oxides (sulfur dioxides), ozone, plastics, dust, biological matter, acrolein, asbestos, benzene, carbon sulfides (carbon disulfides), creosotes, fuel oils, polycyclic aromatic hydrocarbons, synthetic vitreous fibers, total petroleum hydrocarbons, or other pollutant particles, when applicable.

The filter 42 comprises a frame 43 and an active portion 44. The frame 43 is a peripheral frame made of a rigid material such as plastic. The frame 43 may made of a suitable additive-manufacturing material, such as polylactic acid ("PLA") or acrylonitrile butadiene styrene ("ABS") or the like. For example, the material of the frame 43 is the same as the one of the narrow blade 6, which is beneficial for example to limit stresses due to differential thermal deformation. The frame 43 is designed to enable the assembly of the filter 42 to the narrow blade 6, as will be described later. The frame 43 is also designed for maintaining the active portion 44. Such as shown, the frame 43 may further comprise an internal structure 45 such as an armature, to improve rigidity. The frame 43 has a thin thickness, so that the frame 43, and hence the filter 42, may be considered as planar.

The frame 43 has a peripheral contour which has a shape complementary to the shape of the narrow blade portion 4. According to the present example, which is purely illustrative, the frame 43 comprises a radially inner upright 46 which is shaped to correspond to the outer surface of the proximal portion 7 of the neighboring narrow blade 6. For example, the radially inner upright 46 extends along the rotation axis Zr.

The frame 43 further comprises a radially outer upright 47 which is shaped to correspond to the inner face of the distal portion 8 of the narrow blade 6, and is therefore arcuate as can be seen on FIG. 7. Yet, the main direction of extension of the radially outer upright 47 also is the rotation axis Zr.

The frame 43 comprises a bottom crosspiece 48 and a top crosspiece 49. These crosspieces 48, 49 connect the uprights 46 and 47 to one another. The bottom crosspiece 48 may be shaped to fit the bottom portion 12 of the narrow blade 6 and/or extends horizontally. The top crosspiece 49 may be shaped to fit the top portion 13 of the narrow blade 6 and/or extends horizontally.

According to one embodiment, the filter 42 comprises an active portion 44 of activated carbon, also called "activated charcoal". The thickness of the active portion 44 is designed to be able to catch enough particulates, and last for a sufficient time. This may depend on the average local pollution The thickness of the active portion 44 is for example between 1 and 10 millimeters (mm), notably between 1.5 and 8 mm, more preferably before 2 and 6 mm. The thickness is measured orthogonally to the plane defined by the frame 43. The frame 43, and hence the whole filter 42, may have the same thickness as the active portion 44.

Figure 8:
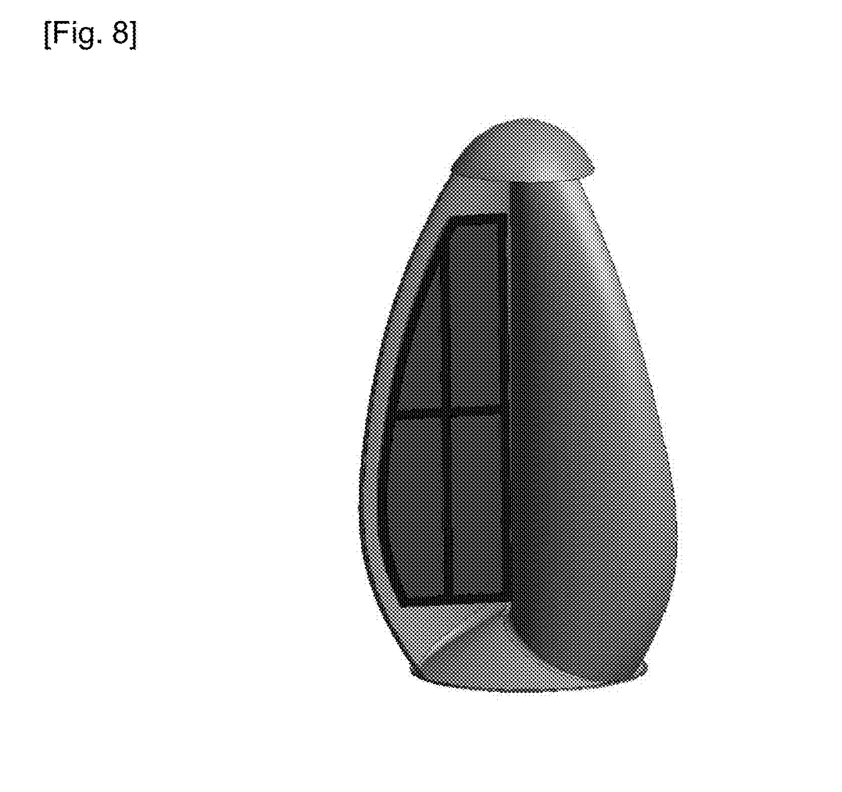
FIG. 8 is a front perspective view of a narrow blade portion with one particulate filter assembled to the rotor.

As can be seen on FIG. 8, the filter 42 is assembled to the narrow blade portion 4 in any suitable way, such as by bolting, riveting or snap-fitting. For example, the filter 42 is removably assembled to the narrow blade portion 4. This could for example be achieved by screwing or snap-fitting. The narrow blade 5 may comprise pegs which enable the frame 43 to be inserted by snap-fitting, by local temporary deformation of the frame 43, the pegs then maintaining the frame in place. Pegs may be provided integral with the narrow blade during the 3D-manufacturing process. In this way, the filter 42 may be withdrawn and replaced by another filter. For example, the active portion 44 may be releasably mounted to the frame 43. The active portion 44 may be compressed in order to be inserted in the frame 43, and is maintained there being permanently compressed. The capacity of the filter 42 is designed so that the replacement of the filter 42 is performed at the same frequency as the overall maintenance of the wind turbine, typically about once a year.

Each of the narrow blades 6 of the narrow blade portions may receive such a filter 42 in their cavity. The filters 42 are thus all identical. The mass of the filters 42 is typically less than 2% of the total mass of the wind turbine, and therefore has a minimal impact on the energetical performance of the wind turbine.

In addition or in the alternative, the wide blades 18 may comprise filters 42 as described above. The shape of these filters 42 is adapted to fit the shape of the wide blades 18.

Alternatively, the wind turbine may have blades of shapes different from that of the wind turbine of FIG. 1. A suitable filter 42 may be assembled to any blade of a wind turbine having a cavity suitable to receive such a filter 42, as was described above with respect to one specific embodiment.

A comparison example is a wind turbine as described above, with the same blade surface as the invention, but with identical widths in the bottom and top blade portions. So, compared with the wind turbine of the invention, the width of the bottom blade portion of the comparison example is less than the width of the wide blade portion of the invention, and the width of the top blade portion of the comparison example is greater than the width of the narrow blade portion of the invention.

Assuming a starting condition of low wind, so that the wind turbine 1 is immobile, when wind speed rises, the wide blade portion enables a lower starting threshold for the wind turbine 1 of the invention as compared to the comparative example. This is due to the fact that the forces exerted at the edge of the wide blades 18 exhibit a larger moment with respect to the rotation axis. So, compared with the comparative example, the wind turbine 1 produces electrical energy at slow winds, where the comparative example does not. As wind picks up, it imparts rotation to the narrow blades 6, which have a lower moment of inertia, which increases the speed of rotation and hence the intensity of generated electrical current.

According to some embodiments, wind turbines such as described above have a starting threshold of less than 10 m/s, even less than 6 m/s, preferably less than 5 m/s.

So, overall, the time during which the wind turbine 1 according to the invention produces electricity is greater than that of the comparative example.

Figure 9:
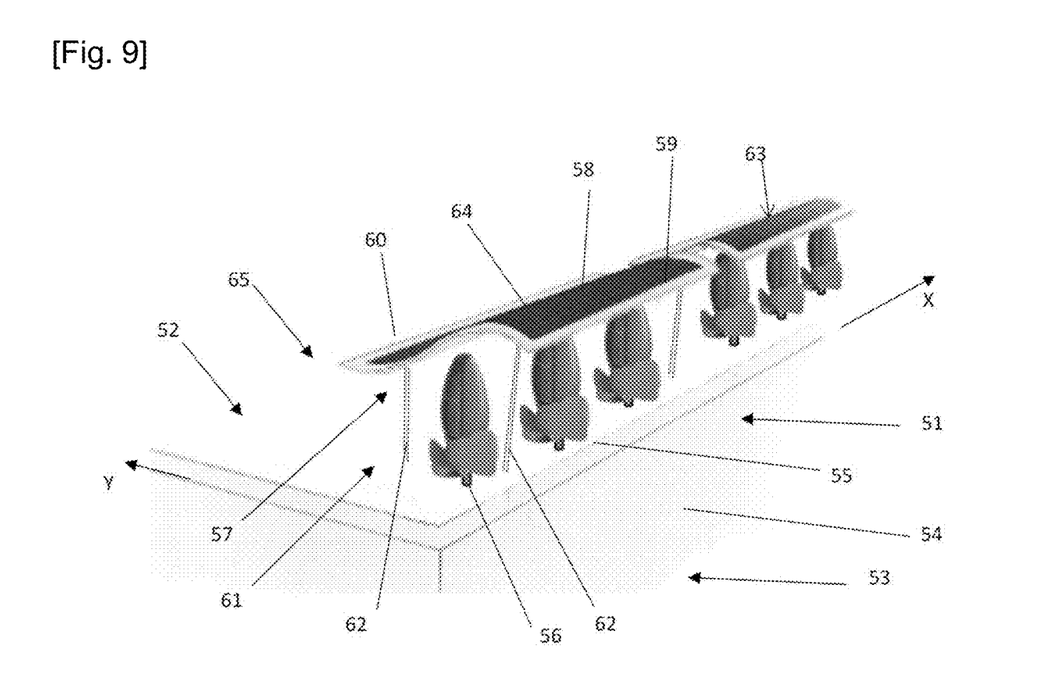
FIG. 9 is a perspective view of a system according to one embodiment of the invention.

As can be seen on FIG. 9, according to one embodiment, an aerogenerator system 51 comprises a plurality of wind turbines. For example, one, at least one, more than one or all of the wind turbines are wind turbines 1 according to the above description.

In particular, these wind turbines 1 may comprise filters 42 as described above. Thus, the whole volume of air which imparts the aerogenerator system 51 can be depolluted.

For example, the electrical generators 29 of one or more or all of the wind turbines of the aerogenerator system 51 are each controlled independently from one another by their respective microcontroller 39. They are electrically connected to one another in parallel, so that the electrical current output by the aerogenerator system 51 is the sum of the electrical currents generated by the individual wind turbines 1. This allows for example various wind turbines to rotate at different speeds (or even potentially some of them not rotating), due to the local flow of wind, screening effects, or any other reasons, and to adapt to ever-changing wind conditions.

The microcontroller 39 may implement an AI-based rule for the control of its individual wind turbine.

As can be seen on FIG. 9, the aerogenerator system 51 may be implemented on a rooftop 52 of a building 53, where wind speed is high. The building 53 may be any suitable building, such as a housing building, an office building, a commercial building, an industrial building, a mixed occupation building or the like. As an example, the rooftop 52 of the building is shown horizontal and flat on FIG. 9, but various different shapes or geometries are possible. The building 53 has a front face 54, which is typically vertical, or close to vertical, and extends along a direction X called "longitudinal direction" in the horizontal plane. The building 53 comprises an edge 55 at the junction of the front face 54 and the rooftop 52

The wind turbines 1 of the aerogenerator system are provided on the rooftop 52. They each comprise a foot 56 which is integral with the stator of the wind turbine 1, and is fixed to the rooftop 52. The wind turbines 1 are fixed to the rooftop close to the edge 55 of the building. For example, the horizontal distance between the foot 56 and the edge 55 is less than 1 meter (m), preferably less than 0.5 m. Further, they are spaced from one another at least along the longitudinal direction X. As an example, as shown on FIG. 9, the wind turbines 1 are all aligned along an axis parallel to the longitudinal direction X, i.e. parallel to the edge 55. However, according to other embodiments, it would be possible to provide other arrangements. The wind turbines may be equally spaced from one another along the longitudinal direction X. In other embodiments, the wind turbines may be provided in groups, and, in each group, the wind turbines maybe equally spaced from one another along the longitudinal direction X. FIG. 9 shows two groups of three wind turbines each. One group will be described in details below, this description being applicable to other groups.

The aerogenerator system 51 comprises a tapering structure 57, which is designed to provide a wind with increased speed at the wind turbines, by comparison with a system without the tapering structure. The following description is based on the assumption that wind turbines are arranged along the edge 55 of a building 53 defined by a front face 54, and that wind may flow generally along a direction Y which is orthogonal to this front face 54, and toward the front face 54. Of course, the presence of the building 53 effects the flow of wind in the region of the edge 55. And of course, the direction of the flow of wind may change with time. For the present description, we'll refer to the direction Y as being the direction of the flow of wind, even though, as explained above, this is an approximation.

The tapering structure 57 comprises a panel 58 above the wind turbines 1. As also visible on FIG. 10, the panel 58 is sufficiently close to the top of the wind turbines 1 to concentrate and accelerate wind at the wind turbines 1. The panel 58 extends from a front portion 59 to an opposite back portion 60 along the direction Y. The panel 58 is supported by any suitable support structure 61 which allows wind to flow between the rooftop 52 and the panel 58 along direction Y, such as by posts 62 or the like.

Figure 10:
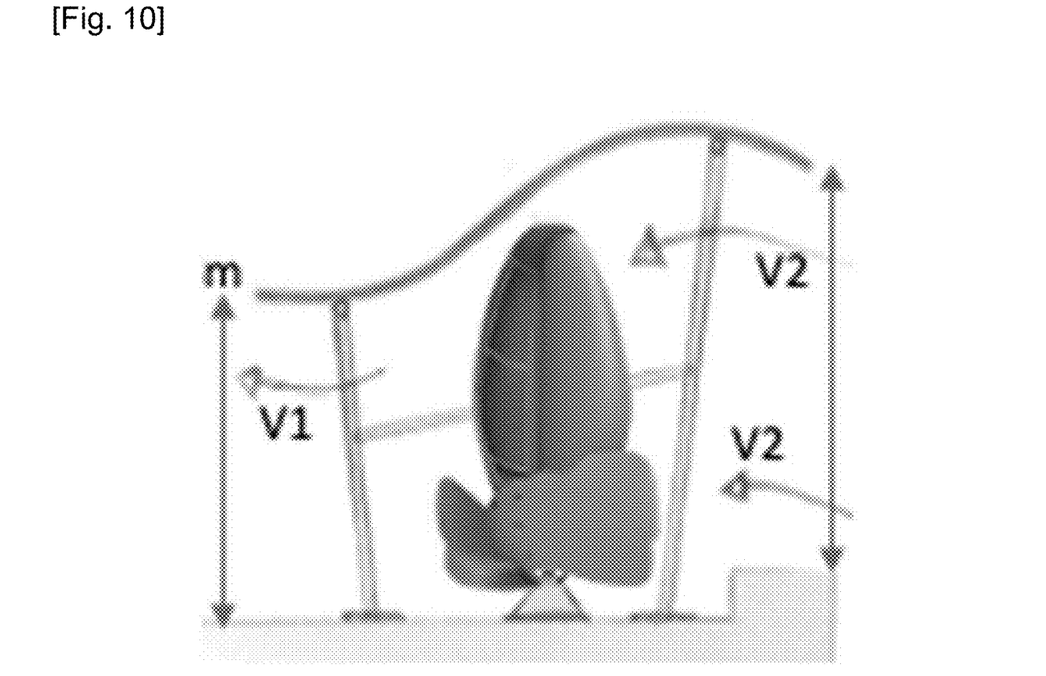
FIG. 10 is a side view of the system of FIG. 9.

The tapering structure 57 is tapering in that the vertical distance between the rooftop 52 and the panel 58 decreases as one moves along the Y direction along the flow of wind. The vertical cross-section in the plane comprising direction Y, enables a reduction of section along this direction Y, but even along a horizontal direction angled with respect to direction Y by an angle comprised in the interval ]-α; α[ with α comprised between 0° and 180°, preferably between 0° and 120°. This tapering structure 57 directs the flow of air toward the wind turbine.

The front portion 59 of the panel 58 lies in front of the wind turbines 1 along the Y direction along the flow of wind, and the back portion 60 of the panel 58 lies behind the wind turbines 1 along this direction.

Notably, the front portion 59 may lie in front of the edge 55 of the building.

The panel 58 is continuous, and is profiled along the longitudinal direction X. This means that the panel 58 has a constant section in the Y-Z plane. The panel 58 may be provided as a thin plate. As shown on FIGS. 9 and 10, it may be provided with a wave shape, whereby the amount of tapering is not constant along the direction Y, but first increases, then decreases. The maximum amount of tapering may be at the intersection with the rotation axis of the wind turbine. With this feature, the panels 58 form a canopy, and the aerogenerator system 51 is provided as an overhanging cornice, which improves acceptability of the invention in the urban environment.

According to one aspect, there may be provided a hybrid energy generating system 65 comprising the aerogenerator system 51 as was described above, and a solar generating system 63. The solar generating system may comprise one or more solar panels 64 adapted to convert energy from the sun into electricity. The solar panels 64 may comprise photovoltaic panels. If necessary, according to the shape of the panel 58, one may use flexible solar panels or semi-flexible solar panels. Such panels are lightweight, may adapt to the shape of the underlying panel, and may be fixed to the panel by any suitable way, such as by mechanical fixation, gluing or else. The hybrid energy generating system 65 may comprise a controller which adds up electrical energy generated by the aerogenerator system 51 and the solar generating system 63. The solar panels 64 are for example provided on the top surface of the panel 58, which is oriented toward the sky.

With the embodiment as described above, assuming wind would flow toward the building 53 sensibly along direction Y in the direction toward the front face 54, wind is gathered by the tapering structure, and concentrated at the wind turbines 1, which increases the rotation speed of the wind turbines 1, and hence the produced energy.

Figure 11:
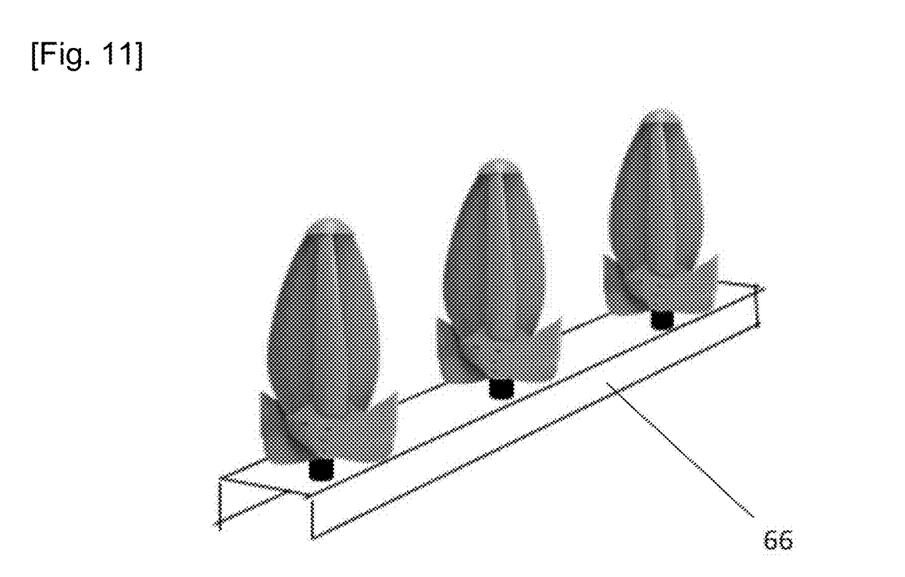
FIG. 11 is a perspective view of another embodiment of a system.

As shown on FIG. 11, the system may comprise a support 66, which is a common support for a plurality of wind turbines. The support 66 may for example be assembled to the building in any suitable way, such as for example by bolting, and if possible in a waterproof way. Each wind turbine is assembled to the support 66 in any suitable way, such as for example by mechanical fixation of the stator to the support 66. The support 66 is for example between 1 meter (m) and 10 meters long. The support 66 may for example comprise a longitudinal beam running along the longitudinal direction X. The support 66 may also be hollow, such that electrical cables (not shown) electrically connecting each wind turbine run in the inner lumen of the support 66.

Figure 12:
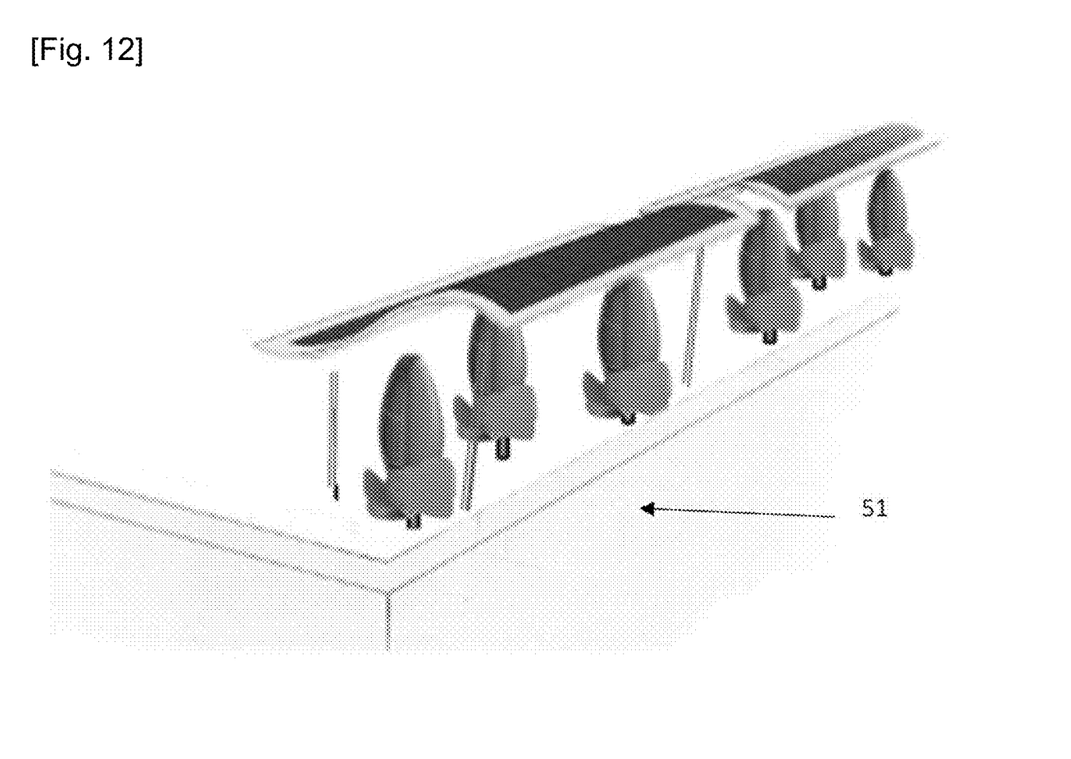
FIG. 12 is a view similar to FIG. 9 for yet another embodiment.

As shown on FIG. 9, if the system comprises strictly more than two wind turbines, they may be aligned along the longitudinal direction X. As a variant embodiment, as shown on FIG. 12, the wind turbines may not be aligned along the longitudinal direction X. Yet, this longitudinal direction X remains the main direction for the system. The wind turbines may be offset from one another along the other horizontal direction Y. The offset may depend on the specific embodiment. The offset may be less than the maximal width of a wind turbine, for example less than half the maximal width of a wind turbine. As shown on FIG. 12, considering a group of three successive wind turbines along the longitudinal direction X, the first and third wind turbines define together a direction aligned with the longitudinal direction X, and the second turbine is offset with respect to this direction away from the edge 55. Alternatively, the second turbine may be offset with respect to this direction toward the edge 55. The groups of wind turbines may be identical to one another, such as shown on FIG. 12. However, the groups of wind turbines may be different from one another. The offset may be useful to address the potential Y-component of the incoming wind, when wind also sometimes partly flow along that direction.

The embodiments above describe a system comprising three wind turbines. Alternatively, one may consider a group of two wind turbines. Alternatively, one may consider a group of more than three wind turbines. For example, the group may be of less than six wind turbines, notably less than five wind turbines, which enables to be handled easily. The rooftop may be equipped with any suitable number of such groups, globally aligned along the edge, depending on the local configuration of the building.

As a variant, the system which has been described may be installed on a terrace and/or a balcony instead of a rooftop. In such cases, barriers may be used to prevent humans or animals to access to the wind turbines in operation, or at least limit this access. These barriers still enable the through flow of air. The system and barriers offer a protection preventing humans or animals to fall from the terrace and/or balcony.

REFERENCES

Wind turbine 1
Stator 2
Rotor 3
Narrow blade portion 4
Wide blade portion 5
Narrow blade 6
Proximal portion 7
Distal portion 8
Front face 9
Back face 10
Edge 11
Bottom portion 12
Top portion 13
Base 14
Top 15
Structure 16
Dome 17
Wide blade 18
Proximal portion 19
Distal portion 20
concave front face 21
convex back face 22
edge 23
bottom housing 24
bottom 25
upper opening 26
shell 27
blade components 28a, 28b
generator 29
generator rotor 30
generator stator 31
electronical circuit 32
microprocessor 39
lobe 40, 40a, 40b
recess 41
filter 42
frame 43
active portion 44
internal structure 45
upright 46, 47
crosspieces 48, 49
cavity 50
aerogenerator system 51
rooftop 52
building 53
front face 54
edge 55
foot 56
tapering structure 57
panel 58
front portion 59
back portion 60
support structure 61
posts 62
solar generating system 63
solar panel 64
hybrid energy generating system 65
support 66

The invention claimed is:

1. An aerogenerator system, comprising:
at least three vertical axis wind turbines, wherein the wind turbines are fixed to a horizontal surface and spaced from one another along a first direction, wherein each wind turbine comprises a bottom foot and a rotor extending upward from the bottom foot, and wherein the rotor is designed to rotate with respect to the bottom foot about a respective vertical rotation axis, and
a tapering structure, located above the wind turbines and the horizontal surface, wherein the tapering structure has a front edge and a back edge, the front edge of the tapering structure and the horizontal surface form a front face on a windward side of the wind turbines during predominant wind flow, the back edge of the tapering structure being on a leeward side of the wind turbines during predominant wind flow, and the tapering structure tapers along a flow direction normal to the first direction from the front edge of the tapering structure to the back edge of the tapering structure so as to direct the flow of air toward the wind turbines,
wherein at least one wind turbine is offset with respect to a longitudinal direction, wherein the offset is less than a maximal width of a wind turbine.

2. The aerogenerator system according to claim 1, wherein the tapering structure is wave-shaped, whereby the degree of tapering first increases and then decreases from the front edge to the back edge of the tapering structure.

3. The aerogenerator system according to claim 1, further comprising a common support for the at least three vertical axis wind turbines.

4. The aerogenerator system according to claim 1, wherein the rotor comprises at least one blade with a cavity, and a particulate filter fixed into the cavity.

5. The aerogenerator system according to claim 1, wherein the rotor of at least one wind turbine comprises at least one narrow blade with a blade edge, wherein the at least one narrow blade has a first maximal lateral extension measured from the rotation axis to the blade edge of the narrow blade, and wherein the rotor comprises at least one wide blade with a blade edge, the at least one wide blade having a second maximal lateral extension measured from the rotation axis to the blade edge of the wide blade, wherein the blades are fixed with respect to one another, wherein the second maximal lateral extension is at least 1.5 times the first maximal lateral extension, and wherein the particulate filter is fixed to either the narrow blade or the wide blade.

6. The aerogenerator system according to claim 5, wherein the narrow blade has a first maximal height along the rotation axis, and the wide blade has a second maximal height along the rotation axis, and wherein the first maximal height is greater than the second maximal height.

7. The aerogenerator system according to claim 5, wherein at least one wind turbine comprises a narrow blade portion and a wide blade portion which are separated from one another along the rotation axis, and wherein all narrow blades of the at least one wind turbine are provided in the narrow blade portion and all wide blades of the at least one wind turbine are provided in the wide blade portion.

8. The aerogenerator system according to claim 7, wherein the narrow blade portion is a single piece.

9. The aerogenerator system according to claim 7, wherein the narrow blade portion is made of an additive manufacturing material.

10. The aerogenerator system according to claim 7, wherein the wide blade portion is mechanically assembled to the narrow blade portion.

11. The aerogenerator system according to claim 7, wherein the wide blade portion comprises a plurality of blade components which are assembled to one another, and wherein the blade components are identical to one another.

12. The aerogenerator system according to claim 7, wherein each wind turbine further comprises an electrical generator comprising a generator rotor and a generator stator, wherein the generator rotor is designed to rotate with respect to the generator stator about the rotation axis, wherein the generator rotor is assembled to the rotor of a respective wind turbine, and wherein the electrical generator is housed within the wide blade portion of the respective wind turbine.

13. The aerogenerator system according to claim 5, wherein at least one wind turbine comprises a first number of at least two narrow blades, wherein the narrow blades are equally spaced from one another about the rotation axis, wherein the wind turbine comprises a second number of at least two wide blades, wherein the wide blades are equally spaced from one another about the rotation axis.

14. The aerogenerator system according to claim 13, wherein the first number is strictly greater than the second number.

15. The aerogenerator system according to claim 1, wherein electrical current generated by the aerogenerator system is a sum of electrical currents generated by the wind turbines.

16. A hybrid energy generating system comprising an aerogenerator system according to claim 1, and a solar generating system comprising at least one solar panel provided on the tapering structure.

17. A system comprising a building having a front face, at least one of a rooftop, terrace and balcony, and a longitudinal edge between the front face and the at least one of a rooftop, terrace and balcony, the system further comprising a hybrid energy generating system according to claim 16, wherein the longitudinal direction is parallel to the longitudinal edge, wherein the horizontal distance between the bottom foot and the longitudinal edge is less than one meter.

18. A system comprising a building having a front face, at least one of a rooftop, terrace and balcony, and a longitudinal edge between the front face and the at least one of a rooftop, terrace and balcony, the system further comprising an aerogenerator system according to claim 1, wherein the longitudinal direction is parallel to the longitudinal edge, wherein the horizontal distance between the bottom foot and the longitudinal edge is less than one meter.

19. An aerogenerator system, comprising:

at least two vertical axis wind turbines, wherein the wind turbines are fixed to a horizontal surface and spaced from one another along a first direction, wherein each wind turbine comprises a bottom foot and a rotor extending upward from the bottom foot, and wherein the rotor is designed to rotate with respect to the bottom foot about a respective vertical rotation axis, and a tapering structure, located above the wind turbines and the horizontal surface, wherein the tapering structure has a front edge and a back edge, the front edge of the tapering structure and the horizontal surface form a front face on a windward side of the wind turbines during predominant wind flow, the back edge of the tapering structure being on a leeward side of the wind turbines during predominant wind flow, and the tapering structure tapers along a flow direction normal to the first direction from the front edge of the tapering structure to the back edge of the tapering structure, and the tapering structure is wave-shaped, whereby the degree of tapering first increases and then decreases from the front edge to the back edge of the tapering structure, so as to direct the flow of air toward the wind turbines.

* * * * *